(12) United States Patent
Tyler et al.

(10) Patent No.: US 10,603,840 B2
(45) Date of Patent: Mar. 31, 2020

(54) ADDITIVE MANUFACTURING SYSTEM HAVING ADJUSTABLE ENERGY SHROUD

(71) Applicant: CC3D LLC, Coeur d'Alene, ID (US)

(72) Inventors: Kenneth Lyle Tyler, Coeur d'Alene, ID (US); Martin S. Mueller, Coeur d'Alene, ID (US)

(73) Assignee: Continuous Composites Inc., Couer d'Alene, ID (US)

( * ) Notice: Subject to any disclaimer, the term of this patent is extended or adjusted under 35 U.S.C. 154(b) by 156 days.

(21) Appl. No.: 15/617,052

(22) Filed: Jun. 8, 2017

(65) Prior Publication Data

US 2018/0065316 A1 Mar. 8, 2018

Related U.S. Application Data

(60) Provisional application No. 62/383,801, filed on Sep. 6, 2016.

(51) Int. Cl.
*B29C 64/209* (2017.01)
*B29C 64/264* (2017.01)
(Continued)

(52) U.S. Cl.
CPC ........ *B29C 64/209* (2017.08); *B29C 35/0805* (2013.01); *B29C 64/106* (2017.08); *B29C 64/264* (2017.08); *B33Y 10/00* (2014.12); *B33Y 30/00* (2014.12); *B33Y 50/02* (2014.12); *B05D 1/26* (2013.01); *B29C 48/154* (2019.02); *B29C 48/2556* (2019.02); *B29C 48/266* (2019.02); *B29C 48/30* (2019.02); *B29C 48/301* (2019.02); *B29C 48/304* (2019.02); *B29C 64/188* (2017.08); *B29C 2035/0827* (2013.01);
(Continued)

(58) Field of Classification Search
None
See application file for complete search history.

(56) References Cited

U.S. PATENT DOCUMENTS 3,286,305 A 11/1966 Seckel
3,809,514 A 5/1974 Nunez
(Continued)

FOREIGN PATENT DOCUMENTS

DE 4102257 A1 7/1992
EP 2589481 B1 1/2016
(Continued)

OTHER PUBLICATIONS

International Search Report dated Oct. 23, 2017 for PCT/US2017/045984 to CC3D LLC Filed Aug. 8, 2017.
(Continued)

*Primary Examiner* — Seyed Masoud Malekzadeh
*Assistant Examiner* — Manley L Cummins, IV
(74) *Attorney, Agent, or Firm* — Ryan C. Stockett

(57) ABSTRACT

A system is disclosed for use in additively manufacturing a composite structure. The system may include a head configured to discharge a composite material including a matrix and a plurality of continuous reinforcements. The system may also include a cure enhancer configured to direct energy to the composite material to enhance curing of the matrix, and a shroud adjustably mounted to the head and configured to selectively block at least some of the energy from reaching the matrix.

20 Claims, 2 Drawing Sheets

(51) Int. Cl.
  *B29C 64/106*  (2017.01)
  *B33Y 10/00*  (2015.01)
  *B33Y 30/00*  (2015.01)
  *B33Y 50/02*  (2015.01)
  *B29C 35/08*  (2006.01)
  *B29C 48/30*  (2019.01)
  *B29C 48/154*  (2019.01)
  *B29C 48/255*  (2019.01)
  *B29C 48/25*  (2019.01)
  *B29C 64/188*  (2017.01)
  *B29K 105/00*  (2006.01)
  *B29K 105/08*  (2006.01)
  *B05D 1/26*  (2006.01)
  *D03D 15/12*  (2006.01)
  *B33Y 70/00*  (2020.01)

(52) U.S. Cl.
  CPC .. *B29K 2105/0058* (2013.01); *B29K 2105/08* (2013.01); *B33Y 70/00* (2014.12); *D03D 15/12* (2013.01)

(56) References Cited

U.S. PATENT DOCUMENTS

| | | | |
|---|---|---|---|
| 3,984,271 A | 10/1976 | Gilbu | |
| 3,993,726 A | 11/1976 | Moyer | |
| 4,643,940 A | 2/1987 | Shaw et al. | |
| 4,671,761 A | 6/1987 | Adrian et al. | |
| 4,822,548 A | 4/1989 | Hempel | |
| 4,851,065 A | 7/1989 | Curtz | |
| 5,002,712 A | 3/1991 | Goldmann et al. | |
| 5,037,691 A | 8/1991 | Medney et al. | |
| 5,121,329 A | 6/1992 | Crump | |
| 5,134,569 A * | 7/1992 | Masters | B29C 35/08 156/272.8 |
| 5,204,124 A * | 4/1993 | Secretan | B29C 64/124 425/145 |
| 5,296,335 A | 3/1994 | Thomas et al. | |
| 5,340,433 A | 8/1994 | Crump | |
| 5,534,101 A * | 7/1996 | Keyworth | B29C 41/22 156/244.12 |
| 5,746,967 A | 5/1998 | Hoy et al. | |
| 5,866,058 A | 2/1999 | Batchelder et al. | |
| 5,936,861 A | 8/1999 | Jang et al. | |
| 6,153,034 A | 11/2000 | Lipsker | |
| 6,459,069 B1 | 10/2002 | Rabinovich | |
| 6,501,554 B1 | 12/2002 | Hackney et al. | |
| 6,803,003 B2 | 10/2004 | Rigali et al. | |
| 6,934,600 B2 | 8/2005 | Jang et al. | |
| 7,795,349 B2 | 9/2010 | Bredt et al. | |
| 8,221,669 B2 | 7/2012 | Batchelder et al. | |
| 8,962,717 B2 | 2/2015 | Roth et al. | |
| 9,126,365 B1 | 9/2015 | Mark et al. | |
| 9,126,367 B1 | 9/2015 | Mark et al. | |
| 9,149,988 B2 | 10/2015 | Mark et al. | |
| 9,156,205 B2 | 10/2015 | Mark et al. | |
| 9,186,846 B1 | 11/2015 | Mark et al. | |
| 9,186,848 B2 | 11/2015 | Mark et al. | |
| 9,266,286 B1 * | 2/2016 | Starodubtsev | B33Y 30/00 |
| 9,327,452 B2 | 5/2016 | Mark et al. | |
| 9,327,453 B2 | 5/2016 | Mark et al. | |
| 9,370,896 B2 | 6/2016 | Mark | |
| 9,381,702 B2 | 7/2016 | Hollander | |
| 9,457,521 B2 | 10/2016 | Johnston et al. | |
| 9,458,955 B2 | 10/2016 | Hammer et al. | |
| 9,527,248 B2 | 12/2016 | Hollander | |
| 9,539,762 B2 | 1/2017 | Durand et al. | |
| 9,579,851 B2 | 2/2017 | Mark et al. | |
| 9,688,028 B2 | 6/2017 | Mark et al. | |
| 9,694,544 B2 | 7/2017 | Mark et al. | |
| 9,701,065 B2 * | 7/2017 | Hang | B29C 64/20 |
| 9,764,378 B2 | 9/2017 | Peters et al. | |
| 9,770,876 B2 | 9/2017 | Farmer et al. | |
| 9,782,926 B2 | 10/2017 | Witzel et al. | |
| 2002/0009935 A1 | 1/2002 | Hsiao et al. | |
| 2002/0062909 A1 | 5/2002 | Jang et al. | |
| 2002/0113331 A1 | 8/2002 | Zhang et al. | |
| 2002/0127345 A1 * | 9/2002 | Rheinberger | A61C 13/0003 427/2.26 |
| 2002/0165304 A1 | 11/2002 | Mulligan et al. | |
| 2003/0044539 A1 | 3/2003 | Oswald | |
| 2003/0056870 A1 | 3/2003 | Comb et al. | |
| 2003/0160970 A1 | 8/2003 | Basu et al. | |
| 2003/0186042 A1 | 10/2003 | Dunlap et al. | |
| 2003/0236588 A1 | 12/2003 | Jang et al. | |
| 2005/0006803 A1 | 1/2005 | Owens | |
| 2005/0061422 A1 | 3/2005 | Martin | |
| 2005/0104257 A1 | 5/2005 | Gu et al. | |
| 2005/0109451 A1 | 5/2005 | Hauber et al. | |
| 2005/0230029 A1 | 10/2005 | Vaidyanathan et al. | |
| 2006/0118198 A1 | 6/2006 | Eisenhut | |
| 2007/0003650 A1 | 1/2007 | Schroeder | |
| 2007/0228592 A1 | 10/2007 | Dunn et al. | |
| 2008/0176092 A1 | 7/2008 | Owens | |
| 2009/0095410 A1 | 4/2009 | Oldani | |
| 2011/0032301 A1 | 2/2011 | Fienup et al. | |
| 2011/0143108 A1 | 6/2011 | Fruth et al. | |
| 2012/0060468 A1 | 3/2012 | Dushku et al. | |
| 2012/0159785 A1 | 6/2012 | Pyles et al. | |
| 2012/0231225 A1 | 9/2012 | Mikulak et al. | |
| 2012/0247655 A1 | 10/2012 | Erb et al. | |
| 2013/0164498 A1 | 6/2013 | Langone et al. | |
| 2013/0209600 A1 | 8/2013 | Tow | |
| 2013/0233471 A1 | 9/2013 | Kappesser et al. | |
| 2013/0292039 A1 | 11/2013 | Peters et al. | |
| 2013/0337256 A1 | 12/2013 | Farmer et al. | |
| 2013/0337265 A1 | 12/2013 | Farmer | |
| 2014/0034214 A1 | 2/2014 | Boyer et al. | |
| 2014/0061974 A1 | 3/2014 | Tyler | |
| 2014/0159284 A1 | 6/2014 | Leavitt | |
| 2014/0175708 A1 * | 6/2014 | Echigo | B22F 3/1055 264/460 |
| 2014/0232035 A1 | 8/2014 | Bheda | |
| 2014/0242208 A1 | 8/2014 | Elsworthy | |
| 2014/0268604 A1 | 9/2014 | Wicker et al. | |
| 2014/0291886 A1 | 10/2014 | Mark et al. | |
| 2015/0136455 A1 | 5/2015 | Fleming | |
| 2016/0012935 A1 | 1/2016 | Rothfuss | |
| 2016/0031155 A1 | 2/2016 | Tyler | |
| 2016/0046082 A1 | 2/2016 | Fuerstenberg | |
| 2016/0052208 A1 | 2/2016 | Debora et al. | |
| 2016/0082641 A1 | 3/2016 | Bogucki et al. | |
| 2016/0082659 A1 | 3/2016 | Hickman et al. | |
| 2016/0107379 A1 | 4/2016 | Mark et al. | |
| 2016/0114532 A1 | 4/2016 | Schirtzinger et al. | |
| 2016/0136885 A1 | 5/2016 | Nielsen-Cole et al. | |
| 2016/0144565 A1 | 5/2016 | Mark et al. | |
| 2016/0144566 A1 | 5/2016 | Mark et al. | |
| 2016/0144570 A1 * | 5/2016 | Kim | B29C 35/0805 425/174.4 |
| 2016/0192741 A1 | 7/2016 | Mark | |
| 2016/0200047 A1 | 7/2016 | Mark et al. | |
| 2016/0243762 A1 | 8/2016 | Fleming et al. | |
| 2016/0263806 A1 | 9/2016 | Gardiner | |
| 2016/0263822 A1 | 9/2016 | Boyd | |
| 2016/0263823 A1 | 9/2016 | Espiau et al. | |
| 2016/0271876 A1 | 9/2016 | Lower | |
| 2016/0297104 A1 | 10/2016 | Guillemette et al. | |
| 2016/0311165 A1 | 10/2016 | Mark et al. | |
| 2016/0325491 A1 | 11/2016 | Sweeney et al. | |
| 2016/0332369 A1 | 11/2016 | Shah et al. | |
| 2016/0339633 A1 | 11/2016 | Stolyarov et al. | |
| 2016/0346998 A1 | 12/2016 | Mark et al. | |
| 2016/0361869 A1 | 12/2016 | Mark et al. | |
| 2016/0368213 A1 | 12/2016 | Mark | |
| 2016/0368255 A1 | 12/2016 | Witte et al. | |
| 2017/0007359 A1 | 1/2017 | Kopelman et al. | |
| 2017/0007360 A1 | 1/2017 | Kopelman et al. | |
| 2017/0007361 A1 | 1/2017 | Boronkay et al. | |
| 2017/0007362 A1 | 1/2017 | Chen et al. | |
| 2017/0007363 A1 | 1/2017 | Boronkay | |
| 2017/0007365 A1 | 1/2017 | Kopelman et al. | |

(56) References Cited

U.S. PATENT DOCUMENTS

| | | |
|---|---|---|
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028640 A1* | 2/2017 | Harrison ............... B29C 69/001 |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |
| 2019/0047309 A1* | 2/2019 | Weiss ................... B41J 2/1714 |

FOREIGN PATENT DOCUMENTS

| | | | |
|---|---|---|---|
| EP | 3219474 A1 | 9/2017 | |
| EP | 3323596 A1 * | 5/2018 | ........... B29C 64/135 |
| KR | 100995983 B1 | 11/2010 | |
| KR | 101172859 B1 | 8/2012 | |
| WO | 2013017284 A2 | 2/2013 | |
| WO | 2016088042 A1 | 6/2016 | |
| WO | 2016088048 A1 | 6/2016 | |
| WO | 2016110444 A1 | 7/2016 | |
| WO | 2016125138 A2 | 8/2016 | |
| WO | 2016159259 A1 | 10/2016 | |
| WO | 2016196382 A1 | 12/2016 | |
| WO | 2017006178 A1 | 1/2017 | |
| WO | 2017006324 A1 | 1/2017 | |
| WO | 2017051202 A1 | 3/2017 | |
| WO | 2017081253 A1 | 5/2017 | |
| WO | 2017085649 A1 | 5/2017 | |
| WO | 2017087663 A1 | 5/2017 | |
| WO | 2017108758 A1 | 6/2017 | |
| WO | 2017122941 A1 | 7/2017 | |
| WO | 2017122942 A1 | 7/2017 | |
| WO | 2017122943 A1 | 7/2017 | |
| WO | 2017123726 A1 | 7/2017 | |
| WO | 2017124085 A1 | 7/2017 | |
| WO | 2017126476 A1 | 7/2017 | |
| WO | 2017126477 A1 | 7/2017 | |
| WO | 2017137851 A2 | 8/2017 | |
| WO | 2017142867 A1 | 8/2017 | |
| WO | 2017150186 A1 | 9/2017 | |

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

International Search Report dated Oct. 13, 2016 for PCT/US2016/042906 to CC3D LLC Filed Jul. 19, 2016.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995), cited by applicant.

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).

* cited by examiner

ADDITIVE MANUFACTURING SYSTEM HAVING ADJUSTABLE ENERGY SHROUD

RELATED APPLICATIONS

This application is based on and claims the benefit of priority from U.S. Provisional Application No. 62/383,801 that was filed on Sep. 6, 2016, the contents of all of which are expressly incorporated herein by reference.

TECHNICAL FIELD

The present disclosure relates generally to a manufacturing system and, more particularly, to an additive manufacturing system having an adjustable energy shroud.

BACKGROUND

Extrusion manufacturing is a known process for producing continuous structures. During extrusion manufacturing, a liquid matrix (e.g., a thermoset resin or a heated thermoplastic) is pushed through a die having a desired cross-sectional shape and size. The material, upon exiting the die, cures and hardens into a final form. In some applications, UV light and/or ultrasonic vibrations are used to speed the cure of the liquid matrix as it exits the die. The structures produced by the extrusion manufacturing process can have any continuous length, with a straight or curved profile, a consistent cross-sectional shape, and excellent surface finish. Although extrusion manufacturing can be an efficient way to continuously manufacture structures, the resulting structures may lack the strength required for some applications.

Pultrusion manufacturing is a known process for producing high-strength structures. During pultrusion manufacturing, individual fiber strands, braids of strands, and/or woven fabrics are coated with or otherwise impregnated with a liquid matrix (e.g., a thermoset resin or a heated thermoplastic) and pulled through a stationary die where the liquid matrix cures and hardens into a final form. As with extrusion manufacturing, UV light and/or ultrasonic vibrations are used in some pultrusion applications to speed the cure of the liquid matrix as it exits the die. The structures produced by the pultrusion manufacturing process have many of the same attributes of extruded structures, as well as increased strength due to the integrated fibers. Although pultrusion manufacturing can be an efficient way to continuously manufacture high-strength structures, the resulting structures may lack the form (shape, size, and/or precision) required for some applications. In addition, conventional pultrusion manufacturing may lack flexibility in cure-rate and/or cure-location of the liquid matrix.

The disclosed system is directed to addressing one or more of the problems set forth above and/or other problems of the prior art.

SUMMARY

In one aspect, the present disclosure is directed to an additive manufacturing system. The additive manufacturing system may include a head configured to discharge a composite material including a matrix and a plurality of continuous reinforcements. The system may also include a cure enhancer configured to direct energy to the composite material to enhance curing of the matrix, and a shroud adjustably mounted to the head and configured to selectively block at least some of the energy from reaching the matrix.

In another aspect, the present disclosure is directed to another additive manufacturing system. This additive manufacturing system may include a head having a nozzle tip configured to discharge a composite material including a matrix and a continuous reinforcement, and a support configured to move the head in multiple dimensions during discharging. The additive manufacturing system may also include a cure enhancer mounted to the head and configured to enhance curing of the matrix, and a shroud mounted to the nozzle tip and configured to selectively block at least some of the energy generated by the cure enhancer from reaching the matrix at a discharge location of the nozzle tip. The shroud may be adjustable in an axial direction of the nozzle tip.

In yet another aspect, the present disclosure is directed to a method of additively manufacturing a three-dimensional structure from a composite material including a matrix and a continuous reinforcement. The method may comprise wetting the continuous reinforcement with the matrix inside of a head, and discharging wetted continuous reinforcement from a nozzle tip of the head. The method may further include directing energy to the wetted continuous reinforcement to enhance curing of the matrix, and selectively blocking the energy from reaching the wetted continuous reinforcement at a discharge location of the nozzle tip.

DETAILED DESCRIPTION

Figure 1:
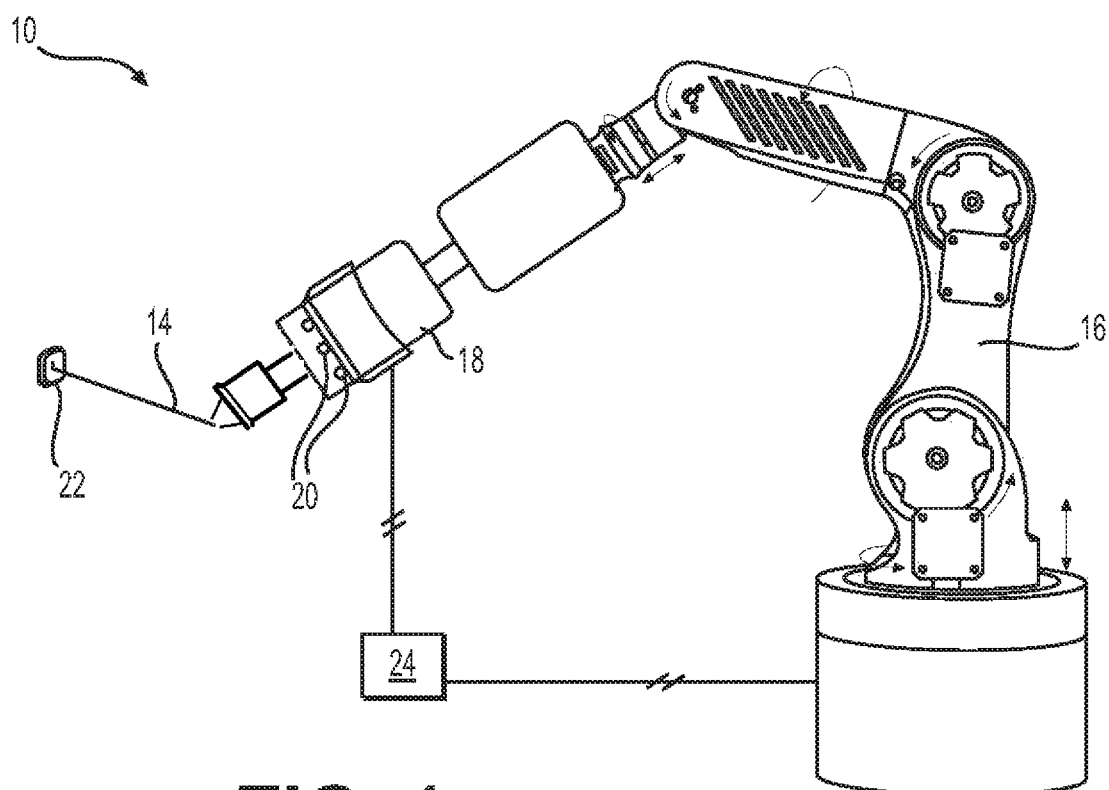
FIGS. 1 and 2 are diagrammatic illustrations of exemplary disclosed manufacturing systems.
Figure 2:
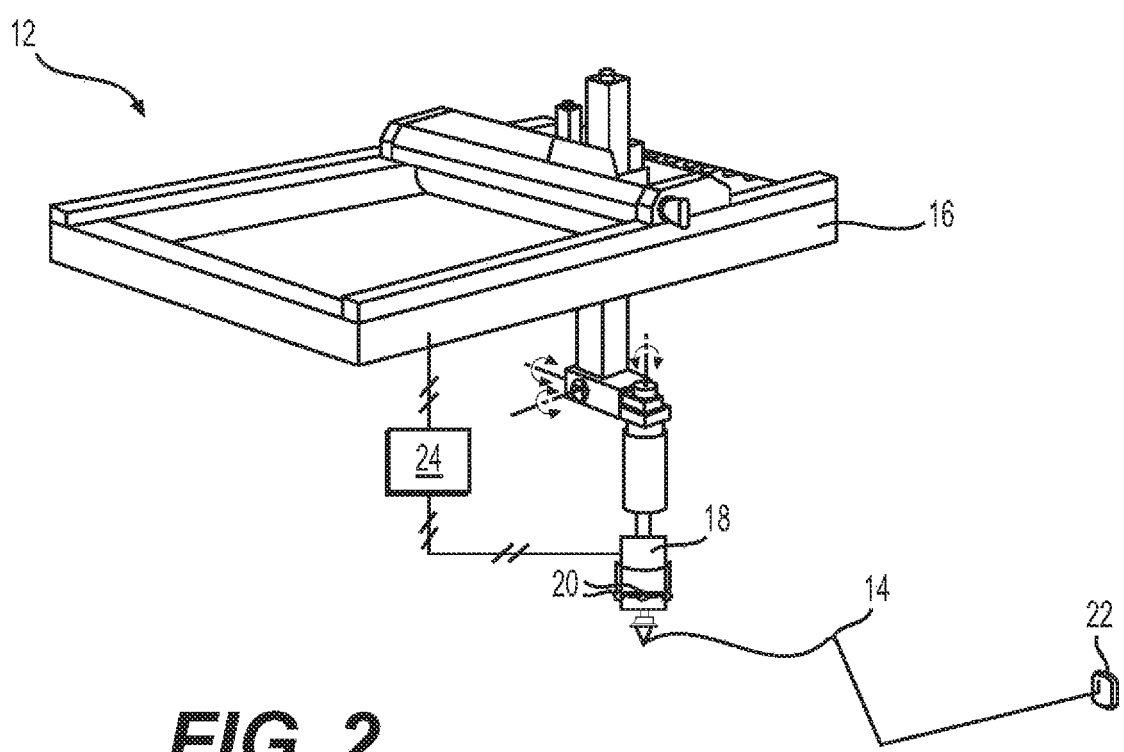

FIGS. 1 and 2 illustrate different exemplary systems 10 and 12, which may be used to continuously manufacture composite structures 14 having any desired cross-sectional shape (e.g., circular, polygonal, etc.). Each of systems 10, 12 may include at least a support 16 and a head 18. Head 18 may be coupled to and moved by support 16. In the disclosed embodiment of FIG. 1, support 16 is a robotic arm capable of moving head 18 in multiple directions during fabrication of structure 14, such that a resulting longitudinal axis of structure 14 is three-dimensional. In the embodiment of FIG. 2, support 16 is an overhead gantry also capable of moving head 18 in multiple directions during fabrication of structure 14. Although supports 16 of both embodiments are shown as being capable of 6-axis movements, it is contemplated that any other type of support 16 capable of moving head 18 in the same or in a different manner could also be utilized, if desired. In some embodiments, a drive may mechanically couple head 18 to support 16, and may include components that cooperate to move and/or supply power or materials to head 18.

Head 18 may be configured to receive or otherwise contain a matrix material. The matrix material may include any type of matrix material (e.g., a liquid resin, such as a zero volatile organic compound resin; a powdered metal; etc.) that is curable. Exemplary resins include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix material inside head 18 may be pressurized, for example by an external device (e.g., an extruder or another type of pump—not shown) that is fluidly connected to head 18 via a corresponding conduit (not shown). In another embodiment, however, the pressure may be generated completely inside of head 18 by a similar type of device. In yet other embodiments, the matrix material may be gravity-fed through and/or mixed within head 18. In some instances, the matrix material inside head 18 may need to be kept cool and/or dark to inhibit premature curing; while in other instances, the matrix material may need to be kept warm for the same reason. In either situation, head 18 may be specially configured (e.g., insulated, chilled, and/or warmed) to provide for these needs.

The matrix material may be used to coat, encase, or otherwise surround any number of continuous reinforcements (e.g., separate fibers, tows, rovings, and/or sheets of material) and, together with the reinforcements, make up at least a portion (e.g., a wall) of composite structure 14. The reinforcements may be stored within (e.g., on separate internal spools—not shown) or otherwise passed through head 18 (e.g., fed from external spools). When multiple reinforcements are simultaneously used, the reinforcements may be of the same type and have the same diameter and cross-sectional shape (e.g., circular, square, flat, etc.), or of a different type with different diameters and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that can be at least partially encased in the matrix material discharging from head 18.

The reinforcements may be exposed to (e.g., coated with) the matrix material while the reinforcements are inside head 18, while the reinforcements are being passed to head 18, and/or while the reinforcements are discharging from head 18, as desired. The matrix material, dry reinforcements, and/or reinforcements that are already exposed to the matrix material (e.g., wetted reinforcements) may be transported into head 18 in any manner apparent to one skilled in the art.

One or more cure enhancers (e.g., a UV light, an ultrasonic emitter, a laser, a heater, a catalyst dispenser, etc.) 20 may be mounted proximate (e.g., within or on) head 18 and configured to enhance a cure rate and/or quality of the matrix material as it is discharged from head 18. Cure enhancer 20 may be controlled to selectively expose surfaces of structure 14 to energy (e.g., UV light, electromagnetic radiation, vibrations, heat, a chemical catalyst or hardner, etc.) during the formation of structure 14. The energy may increase a rate of chemical reaction occurring within the matrix material, sinter the material, harden the material, or otherwise cause the material to cure as it discharges from head 18. In the depicted embodiments, cure enhancer 20 includes multiple LEDs (e.g., 6 different LEDs) that are equally distributed about a center axis of head 18. However, it is contemplated that any number of LEDs or other energy sources could alternatively be utilized for the disclosed purposes and/or arranged in another manner (e.g., unequally distributed, arranged in a row, etc.). For example, the primary and/or auxiliary cure enhancers 20 could be located on an arm (not shown) that trails behind head 18, if desired. The amount of energy produced by cure enhancer 20 may be sufficient to cure the matrix material before structure 14 axially grows more than a predetermined length away from head 18. In one embodiment, structure 14 is completely cured before the axial growth length becomes equal to an external diameter of the matrix-coated reinforcement.

The matrix material and reinforcement may be discharged from head 18 via at least two different modes of operation. In a first mode of operation, the matrix material and reinforcement are extruded (e.g., pushed under pressure and/or mechanical force) from head 18, as head 18 is moved by support 16 to create the 3-dimensional shape of structure 14. In a second mode of operation, at least the reinforcement is pulled from head 18, such that a tensile stress is created in the reinforcement during discharge. In this mode of operation, the matrix material may cling to the reinforcement and thereby also be pulled from head 18 along with the reinforcement, and/or the matrix material may be discharged from head 18 under pressure along with the pulled reinforcement. In the second mode of operation, where the matrix material is being pulled from head 18, the resulting tension in the reinforcement may increase a strength of structure 14, while also allowing for a greater length of unsupported material to have a straighter trajectory (i.e., the tension may act against the force of gravity to provide free-standing support for structure 14).

The reinforcement may be pulled from head 18 as a result of head 18 moving away from an anchor point 22. In particular, at the start of structure-formation, a length of matrix-impregnated reinforcement may be pulled and/or pushed from head 18, deposited onto an anchor point 22, and cured, such that the discharged material adheres to anchor point 22. Thereafter, head 18 may be moved away from anchor point 22, and the relative movement may cause the reinforcement to be pulled from head 18. It should be noted that the movement of reinforcement through head 18 could be assisted (e.g., via internal feed mechanisms), if desired. However, the discharge rate of reinforcement from head 18 may primarily be the result of relative movement between head 18 and anchor point 22, such that tension is created within the reinforcement. It is contemplated that anchor point 22 could be moved away from head 18 instead of or in addition to head 18 being moved away from anchor point 22.

A controller 24 may be provided and communicatively coupled with support 16, head 18, and any number and type of cure enhancers 20. Controller 24 may embody a single processor or multiple processors that include a means for controlling an operation of system(s) 10 and/or 12. Controller 24 may include one or more general- or special-purpose processors or microprocessors. Controller 24 may further include or be associated with a memory for storing data such as, for example, design limits, performance characteristics, operational instructions, matrix characteristics, reinforcement characteristics, characteristics of structure 14, and corresponding parameters of each component of system(s) 10 and/or 12. Various other known circuits may be associated with controller 24, including power supply circuitry, signal-conditioning circuitry, solenoid/motor driver circuitry, communication circuitry, and other appropriate circuitry. Moreover, controller 24 may be capable of communicating with other components of system(s) 10 and/or 12 via wired and/or wireless transmission.

One or more maps may be stored in the memory of controller 24 and used during fabrication of structure 14. Each of these maps may include a collection of data in the form of lookup tables, graphs, and/or equations. In the disclosed embodiment, the maps are used by controller 24 to determine desired characteristics of cure enhancers 20, the associated matrix, and/or the associated reinforcements at different locations within structure 14. The characteristics may include, among others, a type, quantity, and/or configuration of reinforcement and/or matrix to be discharged at a particular location within structure 14, and/or an amount and/or location of curing. Controller 24 may then correlate operation of support 16 (e.g., the location and/or orientation of head 18) and/or the discharge of material from head 18 (a type of material, desired performance of the material, crosslinking requirements of the material, a discharge rate, etc.) with the operation of cure enhancers 20 such that structure 14 is produced in a desired manner.

Figure 4:
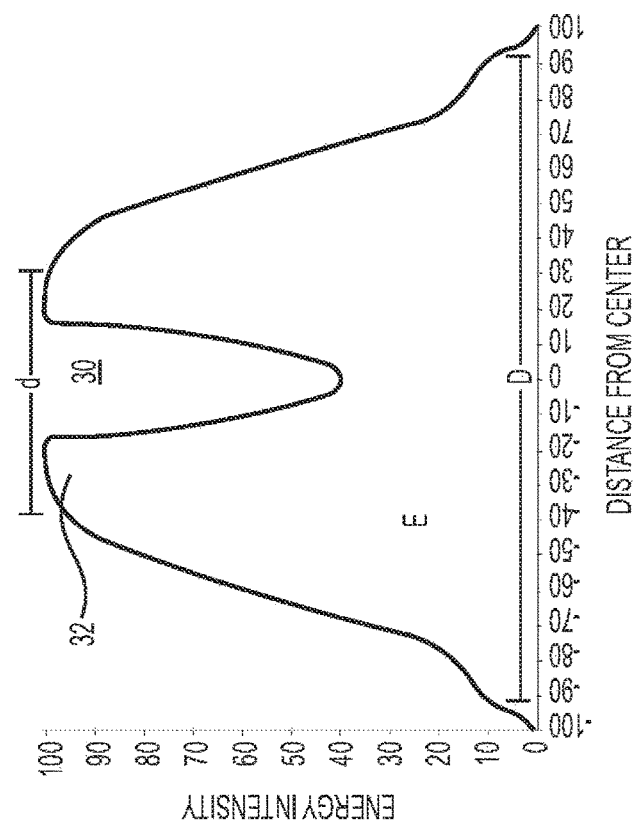
FIG. 4 is a graph illustrating an exemplary operation of the head of FIG. 3.
Figure 3:
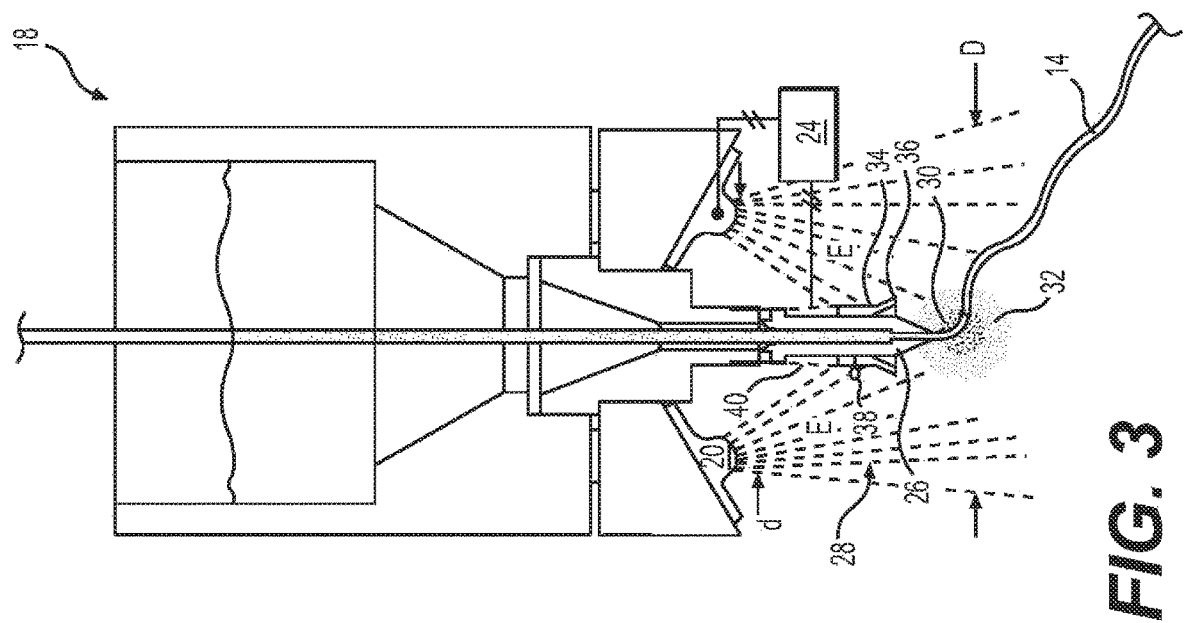
FIG. 3 is a diagrammatic illustration of an exemplary disclosed head that may be used in conjunction with the manufacturing systems of FIGS. 1 and 2.

As shown in FIGS. 3 and 4, the energy E provided by cure enhancer(s) 20 (e.g., because of the configuration and mounting locations of cure enhancer(s) 20 around a nozzle tip 26 of head 18) may have a generally conical shape. The shape may have a smallest diameter "d" at cure enhancer(s) 20 and a larger diameter "D" at nozzle tip 26. At least some of the energy E within the larger diameter D of the cone shape may impact the material discharging from nozzle tip 26, causing the material to cure and quickly harden (e.g., almost instantly). The amount and intensity of this energy E may affect a cure rate and/or cure amount experienced by the material.

In some applications, it may be desirable to inhibit or delay curing of the material discharging from head 18, for example at a location immediately adjacent nozzle tip 26. This may reduce a likelihood of the material hardening while partially inside of nozzle tip 26 and, thus, reduce a likelihood of nozzle tip 26 becoming clogged. For this reason, a shroud 28 (referring to FIG. 3) may be strategically shaped and/or located to create an energy shadow 30 at a center of the irradiation cone. Shadow 30 may be created when at least some of the energy E from cure enhancer(s) 20 being blocked by shroud 28. An annular area 32 immediately adjacent shadow 30 may receive a greatest intensity of energy E from cure enhancer(s) 20 due, for example, to energy being deflected outward by shroud 28 from shadow 30. It is contemplated that a material makeup of shroud 28 could be selected to adjust the energy intensity of area 32, if desired. For example, shroud 28 could be made from a light absorbing material (e.g., black rubber) or from a light deflecting material (e.g., polished metal).

Shroud 28 may include, among other things, a generally cylindrical body 34 that is hollow and at least partially surrounds nozzle tip 26. Body 34 may be moveably connected to nozzle tip 26, such that an axial location of body 34 relative to a discharge location of nozzle tip 26 (i.e., relative to an energy trajectory from cure enhancer(s) 20 to nozzle tip 26) may be adjusted. The axial adjustment of body 34 relative to the discharge location may result in a greater or lesser amount of energy E from cure enhancer(s) 20 that reaches the material discharging from nozzle tip 26. For example, by moving body 34 upward and away from nozzle tip 26, a greater amount of energy E may reach the discharge location, thereby causing the discharging material to cure closer to nozzle tip 26. In contrast, by moving body 34 downward and toward the discharge location of nozzle tip 26, a lesser amount of energy E may reach the discharge location, thereby causing the discharging material to cure further from nozzle tip 26.

A shape and/or size of body 34 may be adjusted for particular applications to thereby adjust an amount of energy E and/or a shape of shadow 30 at nozzle tip 26. In one example, body 34 includes an annular rim 36 at the discharge end of nozzle tip 26 that flares radially outward such that a greater amount of energy E is blocked by body 34 (i.e., such that shadow 30 has a greater diameter). Although rim 36 is shown as having a generally circular and symmetrical shape, it is contemplated that rim 36 could have another symmetrical or irregular shape. The asymmetrical or irregular shape may allow for adjustment in the cure rate at different areas around nozzle tip 26.

In one embodiment, the axial location of shroud 28 is manually adjustable. For example, an adjustment component (e.g., a setscrew) 38 may be associated with (mounted at least partially within) body 34, and selectively disengaged (e.g., loosened) to allow body 34 to slide axially along nozzle tip 26. Once body 34 is in a desired location, adjustment component 38 may be reengaged (e.g., re-tightened) to hold body 34 in this location.

In another embodiment, the axial location of shroud 28 may be automatically adjustable. For example, an actuator 40 may be situated to axially move body 34 along nozzle tip 26. Controller 24 may be in communication with actuator 40 and configured to reference the maps discussed above and selectively energize actuator 40, thereby causing the desired movement of body 34. By doing so, controller 24 may thereby adjust an amount of cure energy E that reaches the discharging material, a location of the cure energy E, a focus of the cure energy E, and/or other energy-related characteristics in relation to the material discharging from head 18. Actuator 40 may be, for example, a piston (e.g., hydraulic or pneumatic piston), a leadscrew, or another type of actuator known in the art. It is contemplated that, in addition to or instead of body 34 being movable, cure enhancer(s) 20 may themselves be capable of moving (e.g., tilting, rotating, axially translating, etc.) to thereby adjust a size, shape, and/or location of shadow 30, if desired, to thereby affect a cure rate of structure 14.

INDUSTRIAL APPLICABILITY

The disclosed systems may be used to continuously manufacture composite structures having any desired cross-sectional shape, length, density, and/or strength. The composite structures may include any number of different reinforcements of the same or different types, diameters, shapes, configurations, and consists, and/or any number of different matrices. In addition, the disclosed systems may experience few (if any) nozzle-clogging issues, and/or allow for adjustable curing of discharging material. Operation of systems 10 and 12 will now be described in detail.

At a start of a manufacturing event, information regarding a desired structure 14 may be loaded into systems 10 and 12 (e.g., into controller 24 that is responsible for regulating operations of support 16, head 18, and/or cure enhancer(s) 20). This information may include, among other things, a size (e.g., diameter, wall thickness, length, etc.), a contour (e.g., a trajectory), surface features (e.g., ridge size, location, thickness, length; flange size, location, thickness, length; etc.), connection geometry (e.g., locations and sizes of couplings, tees, splices, etc.), desired weave patterns, weave transition locations, location-specific matrix stipulations, location-specific reinforcement stipulations, desired cure rates, cure locations, cure shapes, cure amounts, etc. It should be noted that this information may alternatively or additionally be loaded into systems 10 and 12 at different times and/or continuously during the manufacturing event, if desired. Based on the component information, one or more different reinforcements and/or matrix materials may be selectively installed and/or continuously supplied into systems 10 and 12. In some embodiments, the reinforcements may also need to be connected to a pulling machine (not shown) and/or to a mounting fixture (e.g., to anchor point 22). Installation of the matrix material may include filling head 18 and/or coupling of an extruder (not shown) to head 18. Head 18 may then be moved by support 16 under the regulation of controller 24 to cause matrix-coated reinforcements to be placed against or on a corresponding anchor point 22. Cure enhancers 20 may then be selectively activated to cause hardening of the matrix material surrounding the reinforcements, thereby bonding the reinforcements to anchor point 22.

The component information may then be used to control operation of systems 10 and 12. For example, the reinforcements may be pulled and/or pushed from head 18 (along with the matrix material), while support 16 selectively moves head 18 in a desired manner, such that an axis of the resulting structure 14 follows a desired trajectory (e.g., a free-space, unsupported, 3-D trajectory). It should be noted that shroud 28 may move to any axial position at this time, such that a corresponding amount of energy E from cure enhancer(s) 20 is absorbed by the discharging material at a desired location. The axial position of shroud 28 may be selectively adjusted manually (e.g., via loosening and retightening of setscrew 38) and/or under the regulation of controller 24 (e.g., via selective energizing of actuator 40). Once structure 14 has grown to a desired length, structure 14 may be disconnected (e.g., severed) from head 18 in any desired manner.

It will be apparent to those skilled in the art that various modifications and variations can be made to the disclosed systems and head. Other embodiments will be apparent to those skilled in the art from consideration of the specification and practice of the disclosed systems and heads. For example, it is contemplated that shroud 28 could additionally have a blunted bottom edge and function as a wiper or have a sharpened bottom edge and function as a cutoff mechanism, if desired. It is intended that the specification and examples be considered as exemplary only, with a true scope being indicated by the following claims and their equivalents.

What is claimed is:

1. An additive manufacturing system, comprising:
    a head configured to discharge a composite material including a matrix and a continuous reinforcement, the head having a nozzle tip;
    a cure enhancer configured to direct energy to the composite material to enhance curing of the matrix; and
    a shroud adjustably mounted relative to the nozzle tip and configured to selectively block at least some of the energy from reaching the matrix at a discharge location of the nozzle tip.

2. The additive manufacturing system of claim 1, wherein the cure enhancer is mounted to the head.

3. The additive manufacturing system of claim 1, wherein the shroud is mounted to the nozzle tip and adjustable in an axial direction of the nozzle tip.

4. The additive manufacturing system of claim 1, further including a manual adjustment component configured to fix a position of the shroud relative to the head.

5. The additive manufacturing system of claim 4, wherein the manual adjustment component is a setscrew.

6. An additive manufacturing system, comprising:
    a head configured to discharge a composite material including a matrix and a continuous reinforcement;
    a cure enhancer configured to direct energy to the composite material to enhance curing of the matrix;
    a shroud adjustably mounted to the head and configured to selectively block at least some of the energy from reaching the matrix;
    an actuator configured to automatically adjust a position of the shroud relative to the head;
    a controller configured to:
        receive information regarding a structure to be manufactured with the composite material; and
        coordinate operation of the actuator with movement of the head based on the information.

7. The additive manufacturing system of claim 1, further including at least one of a piston and a leadscrew configured to adjust a position of the shroud relative to the nozzle tip.

8. The additive manufacturing system of claim 1, wherein the shroud includes a cylindrical body configured to at least partially surround the nozzle tip of the head.

9. The additive manufacturing system of claim 8, wherein the shroud further includes an outer annular rim that flares radially outward at an end adjacent the discharge location of the nozzle tip.

10. The additive manufacturing system of claim 1, wherein the shroud creates a circular energy shadow at the discharge location of the nozzle tip.

11. The additive manufacturing system of claim 1, further including a support configured to move the head in multiple dimensions during discharging.

12. An additive manufacturing system, comprising:
    a head having a nozzle tip configured to discharge a composite material including a matrix and a continuous reinforcement;
    a support configured to move the head in multiple dimensions during discharging;
    a cure enhancer mounted to the head and configured to direct energy to the composite material after discharge to enhance curing of the matrix; and
    a shroud mounted to the nozzle tip and configured to selectively block at least some of the energy generated by the cure enhancer from reaching the matrix at a discharge location of the nozzle tip, the shroud being adjustable relative to the nozzle tip in an axial direction of the nozzle tip.

13. The additive manufacturing system of claim 12, further including a manual adjustment component configured to fix an axial position of the shroud relative to the nozzle tip.

14. The additive manufacturing system of claim 12, further including an actuator configured to automatically adjust an axial position of the shroud relative to the nozzle tip.

15. The additive manufacturing system of claim 14, further including a controller configured to:
    receive information regarding a structure to be manufactured with the composite material; and
    coordinate operation of the actuator with movement of the head based on the information.

16. The additive manufacturing system of claim 12, wherein the shroud creates a circular energy shadow at the discharge location of the nozzle tip.

17. An additive manufacturing system, comprising:
    a head configured to discharge a composite material including a matrix and a continuous reinforcement;
    a cure enhancer mounted to the head and configured to direct energy to the composite material after discharge to enhance curing of the matrix;
    a shroud configured to selectively block at least some of the energy from reaching the matrix at a discharge location of the head;
    an actuator configured to automatically adjust a position of the shroud relative to the head; and a controller configured to:
   receive information regarding a structure to be manufactured with the composite material; and
   coordinate operation of the actuator with movement of the head based on the information, such that a corresponding amount of energy from the cure enhancer is absorbed by the discharging composite material at a desired location along a planned trajectory.

18. The additive manufacturing system of claim 17, wherein the shroud creates a circular energy shadow at a discharge location of the head.

19. The additive manufacturing system of claim 1, wherein the shroud is fabricated from a light deflecting material and shaped to generate an annular area of greatest energy intensity radially outward of the shroud.

20. The additive manufacturing system of claim 6, wherein the shroud is fabricated from a light deflecting material and shaped to generate an annular area of greatest energy intensity radially outward of the shroud.

* * * * *